United States Patent [19]
Kitagawa

[11] Patent Number: 4,983,932
[45] Date of Patent: Jan. 8, 1991

[54] ELECTRIC NOISE ABSORBER

[75] Inventor: Hiroji Kitagawa, Nigoya, Japan

[73] Assignee: Kitagawa Industries Co., Ltd., Aichi, Japan

[21] Appl. No.: 411,005

[22] Filed: Sep. 22, 1989

[30] Foreign Application Priority Data

Sep. 26, 1988 [JP] Japan .................. 63-125302[U]

[51] Int. Cl.⁵ .............................................. H03H 7/01
[52] U.S. Cl. ...................................... 333/12; 324/127;
333/185; 336/175; 336/176; 439/607
[58] Field of Search ................ 333/12, 185; 336/174,
336/175, 176, 212; 174/36; 439/607, 608, 610;
324/127

[56] References Cited

U.S. PATENT DOCUMENTS

| 750,525 | 1/1904 | Everest | 336/176 |
|---|---|---|---|
| 1,830,541 | 11/1931 | Harris | 336/176 |
| 2,932,805 | 4/1960 | Doherty | 333/243 |
| 4,559,496 | 12/1965 | Harnden, Jr. et al. | 324/127 |
| 4,825,185 | 4/1989 | Matsui | 333/12 X |
| 4,882,561 | 11/1989 | Fujioka | 333/12 X |
| 4,885,559 | 12/1989 | Nakano | 333/12 X |

FOREIGN PATENT DOCUMENTS

| 0257179 | 2/1988 | European Pat. Off. . |
|---|---|---|
| 63-39997 | 3/1988 | Japan . |
| 2179502 | 3/1987 | United Kingdom . |
| 2201554 | 9/1988 | United Kingdom . |
| 2201840 | 9/1988 | United Kingdom . |
| 2205199 | 11/1988 | United Kingdom . |
| 2207007 | 1/1989 | United Kingdom . |

Primary Examiner—Paul Gensler
Attorney, Agent, or Firm—Oliff & Berridge

[57] ABSTRACT

An electric noise absorber comprises an axially divided magnetic body having abutment surfaces, a first joint on which the divided magnetic body can swing, and a second joint having a resilient member. The end of a second joint is attached to one part of the divided magnetic body, and the other end of the second joint can be attached to or detached from the other part of the divided magnetic body. Since the second joint can be unlocked, the electric noise absorber can be easily attached around a desired position on the electric wire without disconnecting the electric wire. When the other end of the second joint is pulled and attached to the magnetic body using the contraction force of the resilient member, the abutment surfaces of the divided magnetic body are held closely adjacent to the electric wire, making a magnetic circuit about the electric wire. The electric noise absorber can thus absorb electric noise with a minimum required structure.

16 Claims, 4 Drawing Sheets

ELECTRIC NOISE ABSORBER

BACKGROUND OF THE INVENTION

The present invention relates to an electric noise absorber attached to a wire of an electronic device for absorbing electric noise which is generated within the device or which enters from the outside into the device through the wire.

As a method for attenuating such noise, it is well-known that magnetic ferrite is attached around a wire to reduce electric noise flowing through the wire.

In a known method, two parts of half ring-shaped ferrite are attached to the wire using an adhesive tape. Since the ferrite is separated into two pieces, the ferrite can be attached to the wire without disconnecting the wire. The ferrite can attenuate electric noise generated in the wire after the electronic device is assembled with the wire. The attenuating effect of the ferrite can be checked on the spot. However, the attachment of the electric noise absorber is a time-consuming work. Once two parts of half ring-shaped ferrite are attached to the wire by placing the adhesive tape around the ferrite, the adhesive tape must be detached from the ferrite to relocate the ferrite, and after relocation new tape must be wound around the wire.

Japan Published Unexamined Utility Model Application No. 63-39997 discloses two parts of half ring-shaped ferrite housed in a retaining case which surrounds the wire in place. The retaining case housing the separated ferrite can be easily attached to the wire, but the retaining case and the ferrite must be configured to engage each other. The retaining case should have resilient members for closely engaging two parts of the ferrite through abutment surfaces of the parts. In addition to the portion for reducing electric noise, the ferrite requires the portions for superimposing the abutment surfaces and for engaging the retaining case. The reduction in size of those portions is a problem with the related-art electric noise absorber.

SUMMARY OF THE INVENTION

The object of the present invention is to provide a compact electric noise absorber that can be attached to or detached from a electric wire.

This object is attained by an electric noise absorber which absorbs electric noise flowing through the electric wire attached to an electronic device. The electric noise absorber comprises an axially divided magnetic body having abutment surfaces for closely receiving the electric wire, and a first joint on which the divided magnetic body can swing. The electric noise absorber further comprises a second joint having a resilient member. The end of the second joint is attached to one part of the divided magnetic body. The other end of the second joint can be detached from or attached to the other part of the divided magnetic body.

DETAILED DESCRIPTION OF THE PREFERRED EMBODIMENTS

Figure 1:
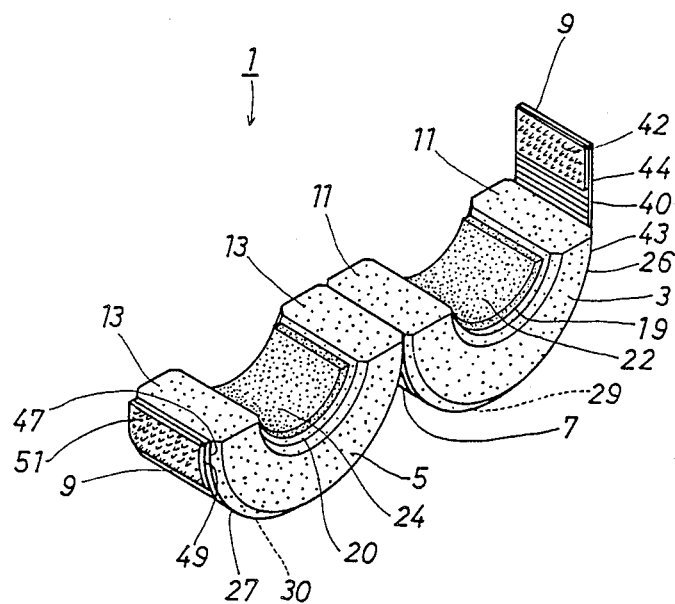
FIG. 1 is a perspective view of an electric noise absorber for a first embodiment of the present invention.

Embodiments of the present invention are explained referring to the drawings.

Figure 3:
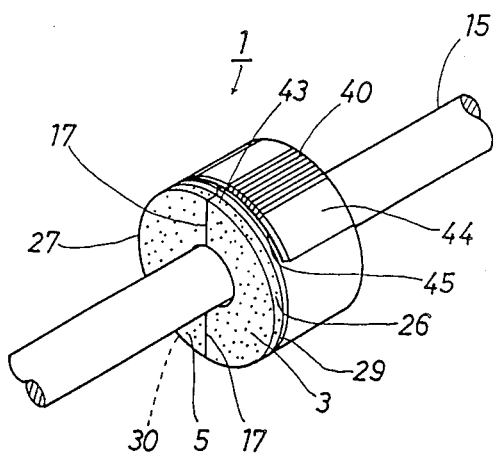
FIG. 3 is a perspective view of the electric noise absorber for the first embodiment which is closed to hold an electric wire.

As shown in FIG. 1, an electric noise absorber 1 for a first embodiment comprises a first magnetic body 3, a second magnetic body 5, a first joint 7 on which the first and second magnetic bodies 3 and 5 swing, and a second joint 9 for superimposing the first and second magnetic bodies 3 and 5. When the first and second magnetic bodies 3 and 5 abut each other through abutment surfaces 11 and 13, they are held such that they surround an electric wire 15. As shown in FIG. 3, where the abutment surface 11 of the first magnetic body 3 is superimposed on the abutment surface 13 of the second magnetic body 5, a cutting plane 17 is formed, and the magnetic bodies 3 and 5 form a magnetic circuit around the electric wire 15. The first and second magnetic bodies 3 and 5 are manufactured by sintering one magnetic body, cutting the body into two with a diamond cutter, and grinding the abutment surfaces 11 and 13. Instead of using the diamond cutter, one magnetic body can be formed in a mold having cutting notches, sintered, and cut into two.

Foam urethane plates 22 and 24, which are adhered, respectively, to inner surfaces 19 and 20 of the first and second magnetic bodies 3 and 5, eliminate space between the magnetic bodies 3, 5 and the electric wire 15. The plates 22 and 24 function to hold the electric wire in position. Plastic films 29 and 30, which are adhered, respectively, to peripheries 26 and 27 of the first and second magnetic bodies 3 and 5, prevent the first and second magnetic bodies 3 and 5 from cracking. The first and second joints 7 and 9 are adhered to the plastic films 29 and 30.

Figure 2:
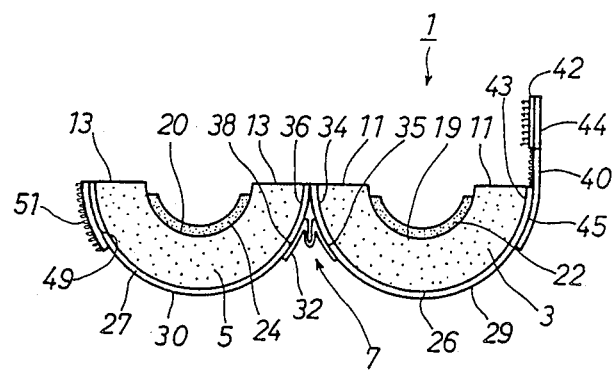
FIG. 2 is a front view of the electric noise absorber for the first embodiment.

As shown in FIG. 2, the first joint 7 comprises a plastic film 32. One end of the plastic film 32 is thermally compressed and bonded to a bonding surface 35 on an end surface 34 of the first magnetic body 3. The other end of the plastic film 32 is thermally compressed and bonded to a bonding surface 38 on an end surface 36 of the second magnetic body 5. The first and second magnetic bodies 3 and 5 swing on the first joint 7. As shown in FIG. 3, the first joint 7 is structured so that no space is made at the cutting plane 17 when the abutment surfaces 11 and 13 of the first and second magnetic bodies 3 and 5 abut each other.

As shown in FIGS. 1 through 3, the second joint 9 comprises a first band 44 and a second band 51. The first band 44 has a resilient member 40 on its center and a tab 42 on one end. The other end of the first band 44 is thermally adhered to a bonding surface 45 of the plastic film 29 covering an end surface 43 of the first magnetic body 3. The second band 51 is thermally adhered to a bonding surface 49 of the plastic film 30 covering an end surface 47 of the second magnetic body 5. The second joint 9 locks and unlocks the first and second magnetic bodies 3 and 5, and gives superimposing pressure to the first and second magnetic bodies 3 and 5. In a preferred embodiment, the first band 44 and the second band 51 are comprised of VELCRO.

In operation, the electric noise absorber 1, which is open as shown in FIG. 1, is attached around the electric wire 15 such that it abuts the abutment surfaces 11 and 13. Subsequently, the first band 44 of the second joint is pulled, and the tab 42 of the first band 44 is engaged with the second band 51 of the second magnetic body 5, using the contracting force of the resilient member 40. Consequently, as shown in FIG. 3, the electric noise absorber 1 holds the electric wire 15 in place. Since the abutment surfaces 11 and 13 abut each other without any space, the first and second magnetic bodies 3 and 5 form a magnetic circuit around the electric wire 15.

In the first embodiment, when the first and second magnetic bodies 3 and 5 are fit onto the electric wire 15 by butting the abutment surfaces 11 and 13 with the second joint 9, the electric noise absorber 1 can reduce electric noise flowing through the electric wire 15. By unlocking the second joint 9, opening the abutment surfaces 11 and 13, and moving the electric noise absorber 1 along the electric wire 15, the most effective position for attenuating electric noise can be easily located. The electric noise absorber 1 has a minimum required structure including the first and second magnetic bodies 3, 5 and the first and second joints 7, 9, for absorbing to maximum the electric noise generated in the electric wire 15 to maximum.

For the first and second magnetic bodies 3 and 5, ferrite containing flexible or hard magnetic material can be used. Instead of ferrite, plastic magnet or rubber magnet, which are molded from magnetic powder mixed with plastic or synthetic rubber, can be used.

Figure 4:
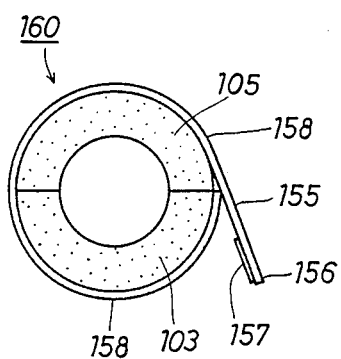
FIG. 4 is a front view of an electric noise absorber for a second embodiment of the present invention.

As shown in FIG. 4, in a second embodiment, the first and second joints 7 and 9 and the plastic film 30 for the first embodiment are formed in one member. An electric noise absorber 160 comprises first and second magnetic bodies 103 and 105, and a band 158 on the periphery of the first and second magnetic bodies 103 and 105. The band 158 has a resilient member 155 and an adhesive tape 157 on an end 156. In the same way as the electric noise absorber 1 of the first embodiment shown in FIGS. 1 through 3, the electric noise absorber 160 of the second embodiment can be easily attached to or detached from an electric wire.

Figure 5:
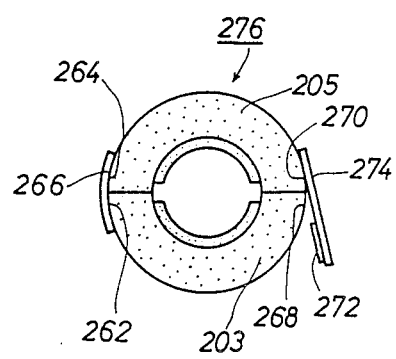
FIG. 5 is a front view of an electric noise absorber for a third embodiment of the present invention.

As shown in FIG. 5, an electric noise absorber 276 for a third embodiment has no protective film like the plastic film 30 for the first embodiment. The electric noise absorber 276 comprises first and second magnetic bodies 203 and 205, a first joint 266 adhered to ends 262 and 264 of the first and second magnetic bodies 203 and 205, and a second joint 274 adhered to other ends 268 and 270 of the first and second magnetic bodies 203 and 205. The second joint 274 has an adhesive tape 272 on it. In the same way as the first embodiment, the electric noise absorber 276 for the third embodiment can be easily attached to or detached from an electric wire.

Figure 6:
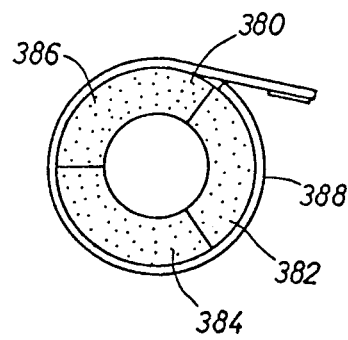
FIG. 6 is a front view of an electric noise absorber for a fourth embodiment of the present invention.

An electric noise absorber of a fourth embodiment in FIG. 6 is almost the same as the electric noise absorber 160 of the second embodiment in FIG. 4. However, in the fourth embodiment, a magnetic body 380 comprises three parts 382, 384 and 386. A band 388, equivalent to the band 158 for the second embodiment, is adhered to parts 382, 384, and 386 of the magnetic body 380.

Figure 7:
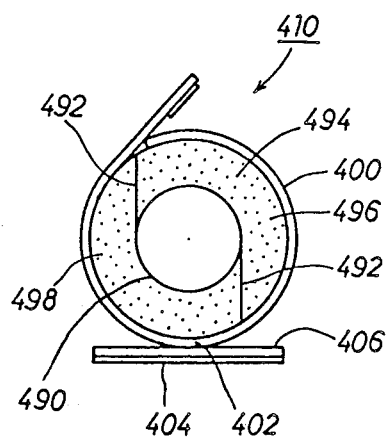
FIG. 7 is a front view of an electric noise absorber for a fifth embodiment of the present invention.
Figure 8:
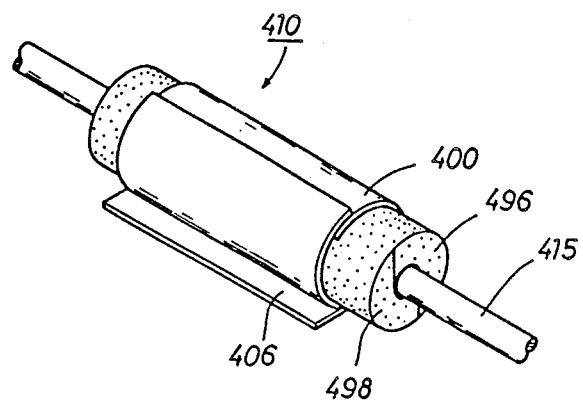
FIG. 8 is a perspective view of the electric noise absorber for the fifth embodiment which is closed to hold an electric wire.

An electric noise absorber 410 of a fifth embodiment in FIGS. 7 and 8 is similar to the electric noise absorber 160 in FIG. 4. However, cutting planes 492 are tangent, rather than perpendicular, to inner surface 490. A magnetic body 494 comprises two parts 496 and 498, and a band 400 is adhered around the magnetic body 494. A fixing plate 406 having an adhesive tape 404 is attached to a center 402 of the band 400. The electric noise absorber 410 which holds an electric wire 415 can be securely attached onto a component of an electric equipment through the fixing plate 406.

Figure 9:
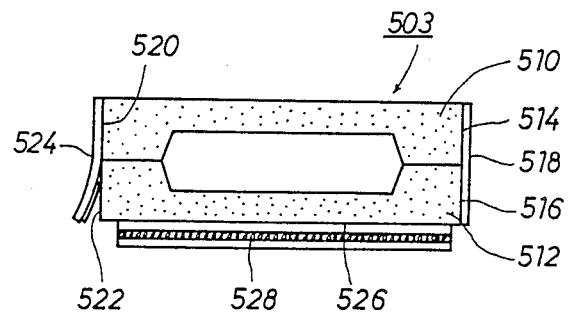
FIG. 9 is front view of an electric noise absorber for a sixth embodiment of the present invention, which receives a flat cable.
Figure 10:
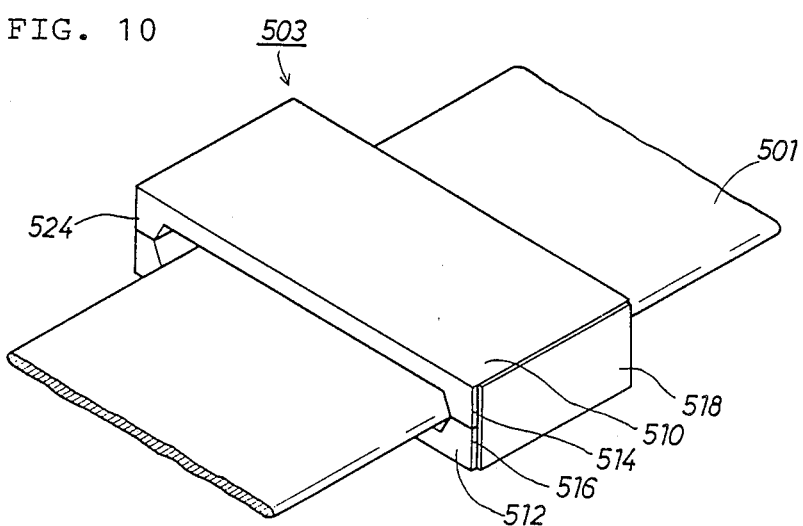
FIG. 10 is a perspective view of the electric noise absorber for the sixth embodiment.

An electric noise absorber 503 for a sixth embodiment in FIGS. 9 and 10 attenuates electric noise flowing through a flat cable 501. The electric noise absorber 503 comprises first and second magnetic bodies 510 and 512 for receiving the flat cable 501 and forming a ferrite magnetic circuit around the flat cable 501. The electric noise absorber 503 further comprises a first joint 518 attached to ends 514 and 516 of the first and second magnetic bodies 510 and 512, and a second joint 524 attached to the other end 520 of the first magnetic body 510. The first magnetic body 510 swings on the first joint 518. The second joint 524 can be attached to or detached from the other end 522 of the second magnetic body 512. A fastening band 528 is placed onto a bottom 526 of the second magnetic body 512.

Figure 11:
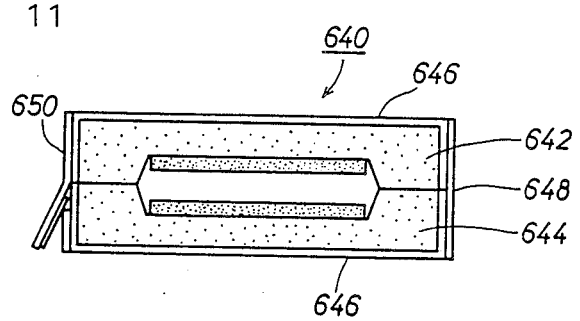
FIG. 11 is a front view of an electric noise absorber for a seventh embodiment of the present invention.

An electric noise absorber 640 for a seventh embodiment in FIG. 11 is a modification of the electric noise absorber 1 for the first embodiment, in which the electric noise absorber 640 is applied to a flat cable. The electric noise absorber 640 comprises first and second magnetic bodies 642 and 644, a cover 646 of the first and second magnetic bodies 642 and 644, and first and second joints 648 and 650.

In the present embodiments, the electric noise absorber comprises a divided magnetic body and joints. When the abutment surfaces of the electric noise absorber abut each other so that the electric noise absorber is held closely adjacent to the electric wire, a magnetic circuit is formed around the electric wire. The electric noise absorber thus reduces electric noise through the electric wire. The magnetic body has a low impedance to 1 MHz through 20 MHz electric noise. When the abutment surfaces in the magnetic body abut each other, the impedance to 1 MHz through 20 MHz increases to a fixed value. The electric noise absorber thus attenuates 20 MHz or less electric noise.

Although specific embodiments of the invention have been shown and described for the purpose of illustration, the invention is not limited to the embodiments illustrated and described. This invention includes all embodiments and modifications that come within the scope of the claims.

What is claimed is:

1. An electric noise absorber for absorbing noise on an electric cord, comprising:
   two bodies of magnetic substance having inner and outer surfaces, where the bodies contact each other at first and second contact points such that they surround the cord;

a plastic film covering said outer surfaces of said two bodies;

a hinge attached to the first and second bodies, rotatably connecting the bodies at the first contact point; and locking means attached to the first and second bodies for selectively interlocking the two bodies at the second contact point, wherein said locking means comprises a locking tab attached to a resilient member that extends from said first body at said second contact point and an engaging band attached to said second body at said contact point, where said resilient member resiliently extends and said locking tab selectively engages the engaging band, thereby securely holding the two bodies together.

2. The electric noise absorber of claim 1, wherein the locking tab is barbed.

3. The electric noise absorber of claim 1, wherein the locking tab and the engaging band are VELCRO.

4. The electric noise absorber of claim 1, wherein the locking tab is adhesive tape.

5. The electric noise absorber of claim 1, wherein contact means are attached to the inner surface of the bodies for eliminating space between the bodies and the cord.

6. The electric noise absorber of claim 5, wherein the contact means are foam urethane plates.

7. An electric noise absorber for absorbing noise on an electric cord, comprising:
a plurality of bodies of magnetic substance that contact each other such that they surround the cord;
a holding means attached to each of said bodies for holding the bodies around the cord, wherein said holding means comprises a single band having a resilient member and adhesive tape at one end, where said single band wraps around said bodies and said tape adheres to the other end of said band, thereby holding the bodies together around the cord.

8. The electric noise absorber of claim 7, wherein the holding means is attached to a film plastic on the surface of the bodies.

9. The electric noise absorber of claim 7, wherein securing means for securing the noise absorber to a surface are attached to the holding means.

10. An electric noise absorber for absorbing noise on an electric cord, comprising:
two bodies of magnetic substance having inner and outer surfaces, where the bodies contact each other at first and second contact points such that they surround the cord, wherein the inner surfaces have a hemispherical groove for receiving the electric cord;
a plastic film covers the outer surfaces of both bodies of magnetic substances;
a hinge attached to said first and second bodies, rotatably connecting the bodies at the first contact point;
an interlock means for interlocking the first and second bodies at the second contact point, comprising an elastic band connected to the plastic film on the first magnetic body at one end and connected to an attaching means at another end and a receiving means for receiving the attaching means attached to the plastic film on the second magnetic body; and positioning means for holding the cord in place attached to the hemi-spherical grooves.

11. An electric noise absorber for absorbing noise in an electrical cord, comprising:
three bodies of magnetic substances having inner surfaces contacting each other at three contact points such that they surround the cord;
a holding means attached to each of said three bodies for holding the bodies around the cord that encircles the bodies;
interlock means attached to the holding means for selectively interlocking the holding means around the cord; and
contact planes are formed on each body at the three contact points, where the contact plane of each body at each contact point is parallel to the contact plane of the adjacent body and the contact planes are perpendicular to the inner surfaces of the magnetic surfaces.

12. An electric absorber for absorbing noise in an electric cord, comprising:
first and second bodies of magnetic substances, each having contacting inner surfaces, with a groove formed in at least one of the inner surfaces for receiving the cord, and first and second sides;
a hinge attached to the first sides of each body rotatably attaching the two bodies;
a locking tab attached to the first body at its second side; and
a receiving pad attached to the second body at its second side;
wherein the locking tab securely attaches to the receiving pad, thereby selectively interlocking the two bodies together around the cord; and
wherein the bodies have an outer surface covered with plastic film, and the hinge, locking tab, and receiving pad are attached to the film on the outer surfaces of the bodies.

13. An electric noise absorber for absorbing noise in an electric cord, comprising:
first and second bodies of magnetic substance, each having contacting inner surfaces, with a groove formed in at least one of the inner surfaces for receiving the cord, and first and second sides;
a hinge attached to the first sides of each body rotatably attaching the two bodies;
a locking tab attached to the first body at its second side; and
a receiving pad attached to the second body at its second side;
wherein the locking tab securely attaches to the receiving pad, thereby selectively interlocking the two bodies together around the cord; and
wherein grooves are formed on the inner surfaces of both bodies, and positioning means are attached to the grooves in the inner surfaces of the bodies for holding the cord in position.

14. An electrical noise absorber for absorbing noise on an electric cord, comprising:
two bodies of magnetic substance that contact each other at two contact points such that they surround the cord;
a hemispherical groove is formed in an inner surface of each body to receive the cord;
contact planes are formed on each body at the two contact points, where the contact planes on the bodies at the contact points are parallel to each other, and the contact planes at each contact point are parallel to a line tangent to the surface of the hemispherical groove at the contact point;

a holding means comprising a continuous band permanently adhered to each of said bodies for holding the bodies around the cord that encircles the bodies; and interlock means attached to the holding means for selectively interlocking the holding means around the cord.

15. An electric noise absorber for absorbing noise on an electric cord, comprising:

two bodies of magnetic substance, where said bodies contact each other at first and second points such that they surround the cord;

a first joint adhered to the ends of said bodies at said first contact point;

a second joint adhered to the ends of said bodies at said second point, wherein adhesive tape is attached to said second joint.

16. An electric noise absorber for absorbing noise on an electric cord, comprising first and second bodies of magnetic substance, each having inner surfaces, with a groove formed in at least one of the inner surfaces for receiving the cord, and first and second sides;

a hinge attached to the first sides of each body rotatably attaching the two bodies;

a locking tab attached to the first body at its second side; and a receiving pad attached to the second body at its second side; and a securing means for securing the noise absorber to a surface, said securing means being attached to one of said bodies;

wherein the locking tab securely attaches to the receiving pad, thereby selectively interlocking the two bodies together around the cord.

* * * * *